United States Patent [19]

Nappen et al.

[11] 3,940,505

[45] Feb. 24, 1976

[54] PROCESS FOR DRYING FOODSTUFFS

[75] Inventors: Bernard H. Nappen, Cranford; Richard M. Boettger, Morristown; Nicholas G. Marotta, Green Brook, all of N.J.

[73] Assignee: National Starch and Chemical Corporation, Bridgewater, N.J.

[22] Filed: Sept. 25, 1974

[21] Appl. No.: 509,299

[52] U.S. Cl. ............... 426/640; 426/616; 426/661
[51] Int. Cl.² ........................................ A23L 1/212
[58] Field of Search ........... 426/371, 372, 205, 206, 426/212, 640, 661, 616

[56] References Cited
UNITED STATES PATENTS

| | | | |
|---|---|---|---|
| 2,777,771 | 1/1957 | Templeton | 426/372 X |
| 3,169,875 | 2/1965 | Hoover | 426/372 X |
| 3,201,260 | 8/1965 | Asselbergs | 426/372 X |
| 3,431,119 | 3/1969 | Griffon | 426/371 X |

*Primary Examiner*—James R. Hoffman
*Attorney, Agent, or Firm*—Thomas B. Graham

[57] ABSTRACT

This invention relates to a rapid method for drying foodstuffs and the foods dried thereby. In particular, the method disclosed involves comminuting the foodstuff, blending therewith starch in an amount of 20 to 96% by anhydrous weight of the total mixture and drum drying to a desired moisture level. The resulting dried and extended foodstuff is superior to conventionally dried foodstuffs in color, fragrance, flavor retention and storage stability.

7 Claims, No Drawings

PROCESS FOR DRYING FOODSTUFFS

BACKGROUND OF THE INVENTION

Since dried foodstuffs, particularly dried fruits and vegetables, can be stored for extended periods of time without deterioration and because tremendous savings in weight and volume are realized, drying has a very strong economic reason for being the preferred method for the preservation of foods, particularly those foods which are used commercially as intermediates in the production of consumer-oriented prepared foodstuffs. With the exception of the expensive freeze-drying technique, commercial drying procedures presently employed result in products which are appreciably reduced in color, flavor and fragrance. This reduction in natural properties is due to a number of factors, primarily the thermal requirements of the specific drying procedures.

Presently employed procedures for drying foods involve blanching or pre-cooking prior to drying; this blanching procedure results in the loss of volatile flavors as well as a loss in natural color and nutrition. Many of the remaining volatile constituents are further removed during conventional procedures such as tunnel drying, particularly in view of the fact that such drying usually requires exposure of the food to elevated temperatures for periods of anywhere from about 6 to about 24 hours. While drum drying does not require such lengthy heating periods, the successful use of this procedure has been limited to only a small number of foods and the resulting products have been deficient in quality and texture.

It is thus an object of the present invention to provide a method for the rapid drying of foodstuffs, particularly fruits and vegetables. It is a further object to provide a method for drying these foodstuffs without the necessity for blanching and with little or no loss in the natural properties of color, flavor and fragrance. It is also an object to provide a method for producing dried foodstuffs which are storage stable and which when reconstituted or otherwise added to foods will desirably contribute to the color, flavor and texture thereof. An ancillary object of the invention is to provide a method for extending foodstuffs with minimal loss of natural properties. These and other objects will become apparent from the description which follows.

SUMMARY OF THE INVENTION

In accordance with the present invention, many foodstuffs, including virtually all fruit and vegetables, can be dried by comminuting and mixing therewith starch in an amount of 20 to 96% by anhydrous weight of the total mixture and thereafter drum drying the mixture to the desired moisture level under conventional conditions. The food is thus rapidly dried so that the final product suffers little or no loss in any of the natural volatile properties. Moreover, this novel procedure can be used to drum dry a wide range of foodstuffs, including such foods as beets, tomatoes, yellow onions, apples, blueberries, etc. Specifically, beets, which heretofore were drum dried to produce a product having poor flavor and quality can be drum dried in accordance with the method of the present invention to produce a product having superior color, flavor and other natural properties. Moreover, heretofore dried mild onion has produced an insipid rehydrated product and it is therefore necessary to breed special pungent hybrid onions for use only in drying in order to obtain a satisfactory product. Surprisingly, we have found that when normal yellow onions are dried according to the method of this invention, a superior product having the taste and fragrance of onion is obtained. The vivid color of blueberries has been reduced in all previous drying procedures except freeze drying; now we have found that the natural color of blueberries is retained when they are dried as described herein. Furthermore, foodstuffs which are presently dried for extended periods of time in tunnel or other dryers may now be dried in conventional drum dryers when they are first treated with starch as disclosed herein.

In addition to retaining the natural properties of the food product, the method of the present invention has a number of other advantages. Not only are color and flavor retained by the avoidance of the blanching operation, the use of the method disclosed herein also results in the economies of saving one operational step and an appreciable amount of equipment in a commercial operation. Furthermore, the foodstuff thus produced has been extended by the addition of the starch component, yet the taste, color and fragrance of the food is not affected and when the thus extended food is reconstituted or added to other foodstuffs, the starch does not separate out, so the final product possesses the required textural characteristics while containing only a fraction of the actual foodstuff. Another feature of the present invention is the improved flow properties attained when the subject method is employed. Using conventional drying methods, many products were quite hydroscopic and often tended to form lumps which caused difficulties in proper metering as well as in effecting dissolution in the final food product; however, the dried products obtained using our novel method are free flowing and retain their flowability even after extended periods of storage. Yet another advantage of the method of the invention is the inactivation of the enzymes during the dormant or dry stage with prompt reactivation upon reconstitution of the foodstuff.

DESCRIPTION OF THE PREFERRED EMBODIMENTS

We have found that a wide range of foodstuffs can be dried using the procedure disclosed herein. Thus, such diverse foodstuffs as beets, peppers, carrots, tomatoes, lemons, limes, oranges, blueberries, strawberries, cranberries, apples, onions, pineapples, bananas, meats, cheeses, garlic, shallots, etc. can be successfully drum dried when first blended with starch in accordance with the method of the present invention.

The method of the invention is not specific to any particular variety of starch and satisfactor results may be obtained using such starches suitable for use in food products as those derived from corn, potato, rice, sago, tapioca, waxy maize, wheat, etc. with tapioca, corn and waxy maize starches being preferred. The starch may be employed in its granular or pregelatinized form. Moreover, modified starches such as dextrins prepared by the hydrolytic action of acids and/or heat, oxidized starches prepared by treatment with oxidants, e.g. sodium hypochlorite, and fluidity or thin boiling starches prepared by enzyme conversion or by mild acid hydrolysis may also be employed. In addition, the starch may be chemically derivatized as by means of an esterification reaction to give esters, for example, the acetates, propionates, and butyrates; or by etherification to yield, for example, hydroxyethyl, hydroxypropyl or carboxymethyl ethers. It should also be noted that for the purpose of this invention the term "starch" is also meant to include flours and meals derived from any of the above described starches since these are also applicable for use in the novel process of this invention.

Depending upon the characteristics required by the use of the reconstituted foodstuff, the starch may be derivatized, crosslinked, etc.; for example, if the reconstituted foodstuff is to be used in a product which will be retorted, it may be desired to employ a suitably inhibited, hydroxypropylated foodstarch in the drying operation. Similarly, if freeze-thaw properties are required in the final product, the starch employed may be treated with both a polyfunctional etherification or esterification reagent and with acetic or propionic anhydride as taught in U.S. Pat. No. 2,935,510.

The amount of starch employed will vary from about 20 to about 96% by anhydrous weight of the total blend with the food and will preferably vary within a range of about 30 to 70%. The preferred amount will of course vary depending upon the particular foodstuff to be dried. Thus, in the case of beets, it is preferred to employ about 40% by weight starch while for lemons, amounts of up to about 70% by weight are desirable.

Prior to incorporation with the starch component, the foodstuff should be comminuted as by dicing, blending, shredding, chopping, mashing or a combination of these procedures. The final size will be a factor of the particular food being dried; thus while beets may be comminuted to about 0.015 in. mesh, other foods such as blueberries will be reduced to a puree before the starch is added. While it is within the scope of the present invention to combine the starch and foodstuff prior to comminuting this procedure is not practical as it involves subjecting such a large quantity of the combined mixture to the comminuting operation.

Ordinarily, the comminuted foodstuff, prior to the addition of the starch, will contain from about 5 to 20% solids, depending on the particular foodstuff. It may be necessary to add additional water in order to facilitate application of the material on the drum dryer.

The starch is added to the comminuted foodstuff in the desired proportions by use of any suitable blending or mixing equipment.

Also, depending upon the particular foodstuff, it may be desirable to treat the food with a sulfiting operation such as with an aqueous solution of sodium bisulfate, sulfur dioxide, sulfurous acid, etc. or to employ another conventional operation prior to drying.

The blended mixture is then dried to a suitable moisture level, usually below about 5%, using conventional drum drying apparatus in accordance with such methods as are known to one skilled in the art. Thus, the drum dryer may be of an atmospheric or vacuum type and may have either a single or double drum. In accordance with a preferred embodiment, the wet blended material is fed onto the drum or drums through a perforated pipe or oscillating arm from a tank or vat provided with an agitator and a rotor. Generally, the drums are steam heated to a temperature within the range of about 290° to 350°F. with the capacity of the drum dryer being proportional to the effective drying area, i.e., the total surface from which drying can take place. The material is dried and removed before one complete revolution and for convenience, conveyors may be provided to remove the dry material from the vicinity of the drum. Then, the material may be flaked or pulverized as required. The drum speed, precise temperature, residence time, gap between drums, etc. combine to contribute to the success of the operation. The preferred conditions will also vary according to the particular food which is to be dried, as will be seen in the examples hereinbelow.

In general, it is desired to reduce the level of moisture to below about 5% by weight. This level may be readily reached using the procedure outlined above; however, if desired, the foodstuff may be partially dried, as to a level of about 10% moisture, using the novel technique of the invention and then subsequently further dried using any conventionally employed methods.

After drying, the dried food in sheet form is removed from the drum dryer and the food flaked or pulverized as desired for the particular end use. Any conventional equipment such as a Ritz mill or hammer mill may be used to effect suitable flaking.

In addition to maintaining the moisture content of the foodstuff below a certain level in order to prevent spoilage, it is also important to maintain the water activity level below about 0.6. Since microorganisms require an abundant supply of water to grow, depriving these organisms of sufficient amount of water is an effective method for prohibiting their growth. One method for determining the amount of water available for microbial growth in a substance is to measure the vapor pressure of water above the substance. This vapor pressure is most meaningfully expressed by dividing it by the vapor pressure of pure water at the same temperature and the same total pressure. The fraction thus obtained is called the water activity, $a_w$, and is a measure of the effective concentration of water in the substance since the difference between the vapor pressure of the substance and that of pure water is due to the presence of dissolved solids in the substance.

Since one of the unique features of the method of the present invention is that the dried product contains its enzymes in an inactivated form, it is not necessary, or indeed desirable for most purposes, to blanch the foodstuff prior to drying, As another option, artificial flavorings, colorings, etc. may be added to the final product although this is not deemed necessary since these natural properties are retained to such a large extent in our novel dried foodstuffs.

It is to be noted that the unique dried food products of this invention can only be adequately described by making reference to the process which has been utilized for their preparation.

The invention will be further explained by the examples which follow.

EXAMPLE I

In this example, beets were drum dried by combining with varying proportions of a waxy maize starch which had been inhibited with approximately 0.06% epichlorohydrin. The raw beets (13% solids) were washed and abraded, diced in ⅜ inch dice and comminuted in a Urschel-Cometrol 3600 machine. The comminuted beets were then combined with varying amounts of the starch as given in Table I below in a mixer and the mixture was pumped onto a drum dryer and dried at a temperature of 295°–300°F. The dried sheet was removed before one revolution was complete and the material flaked and packaged.

As a control, a sample of drum dried beets was prepared without the addition of the starch component.

The drum drying operation was very difficult and a satisfactory sheet was not formed.

The results of the example are shown in Table I below.

TABLE I

| Approximate Beet:Starch Anhydrous Ratio | Drying Temp.°F. | Drum Speed sec/rev | Final Moisture Content | Water Activity |
|---|---|---|---|---|
| 60:40 | 295 | 30 | 2.58% | 0.27 |
| 50:50 | 295 | 27 | 4.81 | 0.40 |
| 40:60 | 300 | 30 | 3.67 | 0.33 |
| 25:75 | 300 | 30 | 4.43 | 0.425 |
| Control (no starch) | 300 | 30 | 3.40 | 0.30 |

The dried beet products containing the starch had excellent deep color, natural taste and after extended storage showed no loss in flowability nor any off-note in fragrance. The pure beet sample which contained no starch was difficult to drum dry, lost color, was sensitive to heat, had an off-note in taste and lost some flowability upon storage.

The dried beets containing 40% starch were then incorporated in an extended tomato paste formula in an amount of 9.0% by weight of the total. The beets readily reconstituted and the thus prepared tomato paste exhibited superior color and texture when compared with a similar product to which beets dried by conventional methods without the addition of starch had been added at the same level.

EXAMPLE II

This example illustrates the use of various starches in drum drying foodstuffs in accordance with the method of the present invention.

The procedure of Example I was repeated using levels of approximately 25% ground beets with 75% starch except in the case of the tapioca dextrin where 40% starch was employed.

TABLE II

|  | A | B | C | D | E |
|---|---|---|---|---|---|
| Wheat flour | 85 g | — | — | — | — |
| Amioca | — | 85 g | — | — | — |
| Corn Starch | — | — | 85 g | — | — |
| Tapioca | — | — | — | 85 g | — |
| Tapioca Dextrin | — | — | — | — | 12 g |
| Ground Beets | 200 g | 200 g | 200 g | 200 g | 200 g |

All the samples dried well and the foodstuffs retained their natural characteristics of color, taste and fragrance.

EXAMPLE III

The procedure and starch used in Example I were employed to drum dry yellow onions (10–12% solids) in the proportions shown in Table III.

TABLE III

| Sample | Onion | Waxy Maize | Anhydrous base Onion:Starch | Water |
|---|---|---|---|---|
| A | 100g | 300g | 4:96 | 225g |
| B | 200g | 200g | 10:90 | 100g |
| C | 300g | 100g | 25:75 | — |
| D | 360g | 40g | 52:48 | — |
| E | 400g | — | — | — |

All samples A through D dried very easily; however, with samples A and B it was necessary to add water to make the solution flowable for application onto the dryer.

Sample E, which did not contain any starch, could not be dried since the onion solution fried as soon as it was placed on the drum.

EXAMPLE IV

Canned crushed pineapple (12–15% solids) was ground and combined with sufficient waxy maize starch inhibited with 0.06% epichlorohydrin to give an anhydrous pineapple:starch ratio of 25:75. The foodstuff was easily drum dried to give an excellent product.

As a comparison, an attempt was made to drum dry the pineapple without the addition of the starch component; however, the pineapple bacame very tacky and would not form a satisfactory dry film.

EXAMPLE V

In accordance with the procedure of Example I, lemons (10–12% solids) were ground and mixed with varying proportions of the inhibited waxy maize starch used in Example I. The results are shown in Table IV.

TABLE IV

| Lemon | Starch | Water | Anhydrous Lemon:Starch | Results |
|---|---|---|---|---|
| 100g | 300g | 300g | 4:96 | Excellent |
| 200g | 200g | 100g | 12.5:87.5 | Excellent |
| 300g | 100g | 50g | 30:70 | Excellent |
| 360g | 40g | 20g | 55:45 | Slightly tacky |
| 150g | — | — | — | Very tacky and unsatisfactory |

EXAMPLE VI

This example illustrates methods for drum drying whole tomatoes and canned tomato paste.

A— Three parts canned whole tomatoes containing 12% solids were comminuted and blended with one part of an acetylated inhibited waxy maize starch and drum dried. No difficulties were encountered and the product possessed superior properties.

B— Three parts tomato paste (28% solids) were combined with one part of the starch used in A above and drum dried. The dried product was darker in color than Sample A. When mixed with water, the product dispersed instantly.

EXAMPLE VII

The procedure and starch used in Example I were again used to drum dry a variety of fruits and vegetables. The results are shown in Table V below.

TABLE V

| Foodstuff | % Solids | Wt. Food | Wt. Starch | Water |
|---|---|---|---|---|
| Orange | 20 | 600g | 120g | — |
| Orange juice (conc.) | 50 | 400g | 400g | 200g |
| Peppers | 7 | 500g | 35g | — |
| Strawberry | 10 | 500g | 50g | — |
| Blueberry | 15 | 600g | 90g | — |
| Apple | 15 | 500g | 75g | — |

In all cases the foods dried well and yielded products with natural color, taste and fragrance.

In summary it is seen that the blending of starch with a comminuted foodstuff permits easy and rapid drum drying of the foodstuff while producing an extended food product which has retained its natural propeties of color, fragrance and flavor.

We claim:
1. A method for drying foodstuffs comprising the steps of:
 a. comminuting the uncooked foodstuff,
 b. blending therewith a starch in an amount of 20–96% by anhydrous weight of the total mixture, and
 c. drum drying the mixture of uncooked foodstuff and starch to a moisture level of less than 10%.

2. The method of claim 1 wherein the starch is blended with the foodstuff in an amount of 30 to 70% by anhydrous weight of the total mixture.

3. The method of claim 1 wherein the foodstuff is drum dried at a temperature of 290° to 350°F.

4. The method of claim 1 wherein the food starch employed is tapioca, waxy maize, corn starch or a derivative thereof.

5. The method of claim 1 wherein the foodstuff is drum dried to a moisture level of less than 5%.

6. An extended dried uncooked foodstuff comprising a blend of a foodstuff in comminuted form together with a starch in an amount of 20–96% by anhydrous weight of the total mixture, which blend has been drum dried at a temperature of 290° to 350°F. to a desired moisture level.

7. The extended foodstuff of claim 6 wherein the foodstuff is a fruit or a vegetable.

* * * * *